UNITED STATES PATENT OFFICE.

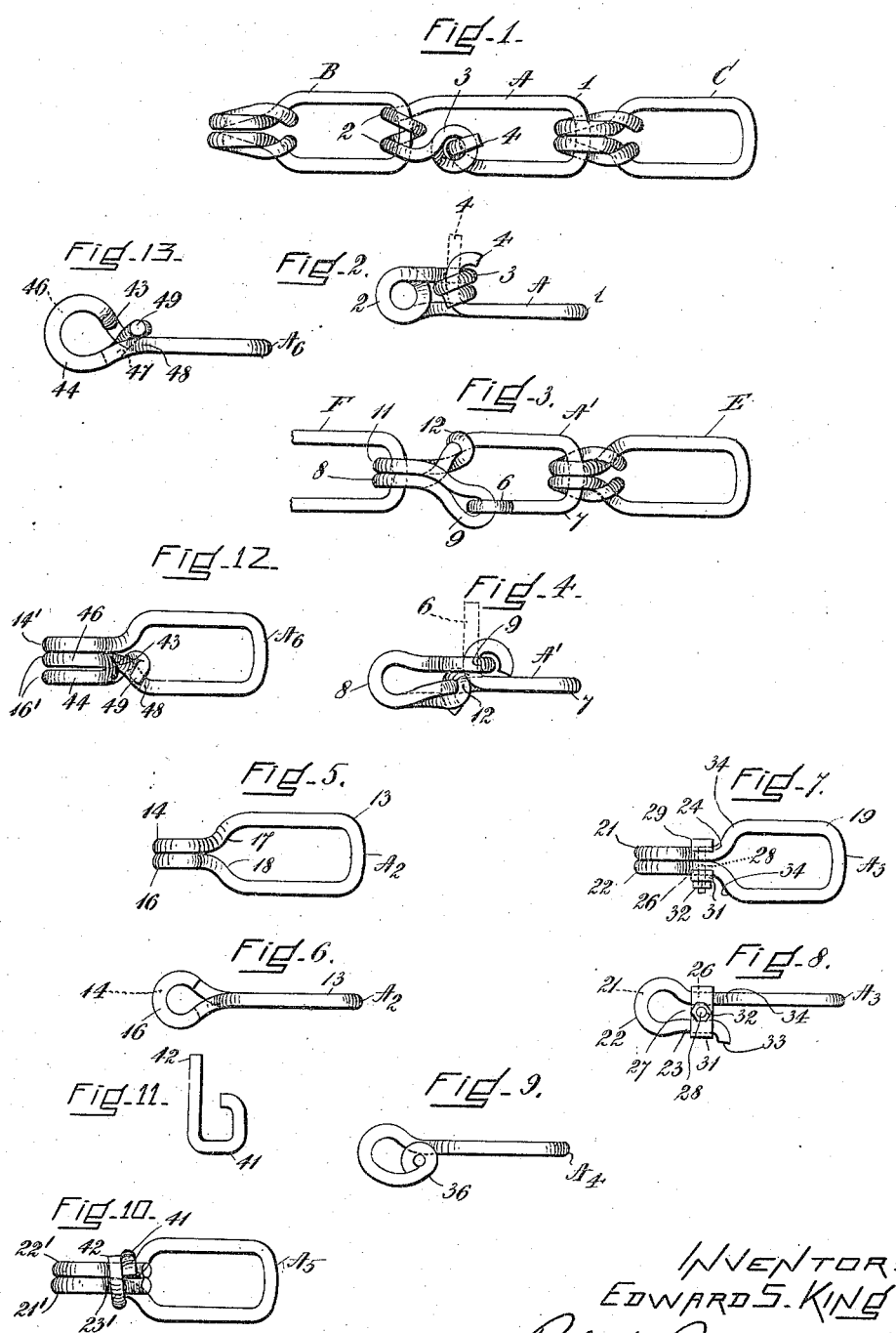

EDWARD S. KING, OF BROOKLINE, MASSACHUSETTS.

CHAIN-LINK.

1,307,298.  Specification of Letters Patent.  Patented June 17, 1919.

Application filed March 20, 1917. Serial No. 156,193.

*To all whom it may concern:*

Be it known that I, EDWARD S. KING, a citizen of the United States, and resident of Brookline, in the county of Norfolk and State of Massachusetts, have invented new and useful Improvements in Chain-Links, of which the following is a specification.

This invention relates to chain links and more particularly to chain links adapted to replace broken links thereby to repair broken chains.

In many situations where chains are employed the facilities for repairing broken chains are extremely limited. A notorious example of this condition occurs in the use of tire chains on automobiles where the breaks usually occur on the road more or less remotely from a repair station. Under such conditions it has heretofore been customary either to carry extra chains for emergency use or to forego the use of chains until a repair or service station is reached.

The principal object of my invention is to provide a repair link which can be substituted for a broken link without the assistance of the usual chain repairing facilities. Another object is to provide a chain link into which the coöperating links may be inserted in a simple manner and preferably through a single opening in the link. A further object is to provide a repair link having its opposite ends angularly disposed with respect to each other relatively to the longitudinal axis of the link, whereby the adjacent links having their ends similarly arranged as in the well-known types of chains may be connected with the repair link in such manner that the chain when repaired is not twisted. Still another object is to provide means for preventing the link from straightening out under tension, that is, from being so distorted as to destroy the angular relationship of the opposite ends, and to so arrange the means that it also functions to assist in connecting the free ends of the link together to close the opening into the link after the coöperating links have been inserted thereinto.

Other objects of the invention will be apparent from the following description and the accompanying drawings, in which,—

Figure 1 is a plan view of one embodiment of my invention, showing the repair link in operative relationship with adjacent links of a chain;

Fig. 2 is a side view of the improved link shown in Fig. 1;

Fig. 3 is a plan view of another embodiment of my invention;

Fig. 4 is a side view of the improved link shown in Fig. 3;

Fig. 5 is a plan view of another embodiment of my invention;

Fig. 6 is a side elevation of the link shown in Fig. 5;

Fig. 7 is a plan view of still another embodiment of the invention;

Fig. 8 is a side view of the link shown in Fig. 7;

Fig. 9 is a side view of still another embodiment of the invention;

Fig. 10 is a plan view of another embodiment of my invention.

Fig. 11 is an end view of a fastening device employed with the embodiment shown in Fig. 10;

Fig. 12 is a plan view of another embodiment of my invention; and

Fig. 13 is a side view of the link shown in Fig. 12.

In the particular form of my invention illustrated in Fig. 1, the repair link A is shown in operative relationship to links B and C of a well-known type of chain. The repair link A is provided with a looped end 1 and with a plurality of loops 2 at the other end. The loops 2 are disposed in substantially perpendicular relationship to the loop 1 so that when the link is inserted between the adjacent links B and C the links B and C are permitted to lie in the same plane, and the major portion of the link A is also disposed in this same plane. In order to permit the insertion of the links B and C into the link A, an opening is provided as shown on the lower side of link A, and the free ends of the link are arranged to overlap at the opening. The free end 3 is bent into a substantially circular form so as to form an eye, and the other end 4 is preferably bent at right angles into alinement with the opening in the eye 3. By springing the two ends apart, the links B and C may be inserted through the opening between the ends 3 and 4, after which the end 4 is inserted through the eye in end 3 as indicated in dotted lines in Fig. 2, and the end 4 may then be bent over as shown in full lines in Fig. 2, by means of a hammer or other suitable means.

The link B is manipulated into the position shown in Fig. 1 before the ends 3 and 4 are interlocked together, in the following manner: The link B is placed in a vertical transverse plane with its left-hand end extending downwardly and in this position is passed over the end 3 of link A between the lower and upper loops 2. The link B is then rotated to the left about the vertical axis of the loops 2 through 360°, after which it is surrounded by both loops 2 and can be swung up in the position shown in Fig. 1. The eye 3 should not extend too far from the left-hand end of the link inasmuch as the described rotation of the link B about the vertical axis through the loops 2 carries the link B around the eye 3. Inasmuch as the link B is given one complete revolution after being inserted in the link A, the portion of a chain to which B is attached should be rotated in the reverse direction one revolution before the link B is passed through the opening in link A.

The embodiment of the invention illustrated in Figs. 3 and 4 comprises a link A' having an opening therein, and having one end 6 of the link bent upwardly at right angles at the opening. From this end the link extends through the link E in the form of a loop 7, thence through the link F in the form of a loop 8, thence to the opening adjacent the end 6, where it is folded back forming an eye 9, then passes through link F in the form of a loop 11, and is preferably secured to the side of the link by means of a loop 12. The link is so shaped that the end 7 is disposed in the plane of the main portions of links E and F, while the loops 8 and 11 are disposed at right angles to the loop 7 so as properly to coöperate with the link F. It will be observed that the twist in the link A', which affords the right-angle relationship between the two ends of the link, is disposed in the double portion of the link, that is in the portion rendered double by virtue of the end 12 being folded backwardly along the loop 8. This results in a much more rigid construction and strengthens the link throughout the portion which is most likely to be distorted by tensional stresses. For example, a longitudinal pull on the link A' might tend to untwist it and straighten it out in the absence of the construction described. Moreover, the folded arrangement not only strengthens the link but also provides the eye 9 which coöperates with the free end 6 of the link in closing the opening. This is of considerable importance inasmuch as the eye cannot be opened by an abnormal longitudinal pull, as it might with a construction such as shown in Figs. 1 and 2.

The link A' is placed in position by removing the upturned end 6 from the eye 9 and passing the links E and F through the opening therebetween. The end 6 is then inserted into the eye 9 and bent over into the full line position in any suitable manner. It will be understood that this link is preferably manufactured in the form shown in dotted lines in Fig. 4, that is with the end 6 projecting at right angles from the link.

The embodiment of my invention shown in Figs. 5 and 6 comprises a main portion 13 having substantially the shape of the main portions of the links B, C, E and F and having eye portions 14 and 16. The eyes 14 and 16 are preferably formed by bending the ends of the link into the form of circles in planes perpendicular to the plane of the main portion 13. Moreover, the eyes 14 and 16 are preferably formed by bending the ends in opposite directions so that, as viewed in Fig. 6, the eye 14 comprises a downwardly turned hook, and the eye 16 comprises an upwardly turned hook. The ends of the hooks 14 and 16 do not extend to the body of the link, but terminate a sufficient distance from the body to permit the passage of a coöperating link such as link F, in Fig. 3.

The link $A_2$ is preferably manufactured in substantially the shape shown in Figs. 5 and 6, that is, with the eyes or hooks 14 and 16 disposed substantially in parallelism and substantially in contact with each other. In connecting the coöperating links with the link $A_2$ the eyes 14 and 16 are forced apart, this being possible by virtue of the elasticity of the link. The link which is to coöperate with the right-hand end of link $A_2$ is inserted first, either by passing it over the eye 14 or the eye 16 if the opening therein is large enough, or in the event that the opening is relatively small as in the left-hand end of link E in Fig. 3, the link may be inserted through the gap between the end of one of the hooks 14 or 16 and the body of the link, and then rotated about the axis of the eye through 180°, after which it may be passed to the right-hand end of the link. The link coöperating with the left-hand end of link $A_2$ is connected thereto by springing the eyes 14 and 16 apart, positioning the coöperating link in a plane passing between the eyes, inserting the coöperating link between the eyes, rotating the link through 90°, and then moving it to the left so that its end passes through the openings between the ends of hooks 14 and 16 and the main body of the link. The elasticity of the repair link then causes the eyes 14 and 16 to move together into the position shown in Fig. 5, after which the coöperating link is prevented from being displaced from the eyes by virtue of the portions 17 and 18 of the link moving into juxtaposition. The displacement of the coöperating link may be still further guarded against by closing the gaps between the ends of the hooks 14 and 16 and the bodies of the link by means of a hammer or other suitable means.

The embodiment of the invention shown in Figs. 7 and 8 comprises a link $A_3$ having a main body portion 19 similar to that of the link shown in Figs. 5 and 6 and having hooks 21 and 22 somewhat similar to hooks 14 and 16 in Figs. 5 and 6. However, these hooks are preferably bent in the same direction, and instead of terminating short of the body portion as in Figs. 5 and 6, they are provided with portions 23 extending backwardly along the base portions of the hooks, the hooks preferably being provided with base portions or shanks 24 and 26 connecting the hooks with the body portion of the link. A slight gap 27 is preferably left between the shanks 24 and 26 and the ends 23 for the passage of a bolt 28 or other suitable securing means. The bolt 28 is provided with a head 29 having a curved cross-sectional outline so as to extend partially around the shank 24 and one of the ends 23. A washer 31 having a similar cross-sectional outline is provided to engage the shank 26 and the other end 23.

The right-hand link coöperating with link $A_3$ is connected therewith in either of the ways described in connection with link $A_2$ by springing the hooks 21 and 22 apart. The link coöperating with the left-hand end of link $A_3$ is inserted into the eyes 21 and 22 simultaneously by passing it through the spaces 27. The bolt 28 is then inserted in the position indicated, after which the washer 31 is placed in position and the hooks clamped together by means of the nut 32. The extreme ends of the portions 23 may, if desired, be bent over as indicated at 33 in order to assist in preventing the bolt 28 from sliding off the portions 23. However, this function is ordinarily performed in a satisfactory manner by the shoulders 34 of the body portion of the link.

The embodiment shown in Fig. 9 is very similar to that shown in Figs. 7 and 8, except that the ends of the link $A_4$ are bent around to form eyes 36, through which a bolt similar to that shown at 28 in Figs. 7 and 8 may be inserted.

The link $A_5$ shown in Fig. 10 is substantially identical with the link illustrated in Figs. 7 and 8 except in that the portions 23' of the hooks 21' and 22' extend backwardly along the shanks in juxtaposition to the shanks instead of being separated from the shanks by a space such as shown at 27 in Fig. 8. The link coöperating with the right-hand end of link $A_5$ is passed over one of the hooks 21' or 22' either directly or by springing the end 23' outwardly so that the coöperating link may pass between the end of the hook and the shank of the hook thereby surrounding only one thickness of the link member. The link coöperating with the left-hand end of $A_5$ is inserted into the hooks 21' and 22' by springing the ends 23' outwardly from the shanks of the hooks sufficiently to permit the coöperating link to pass therebetween.

The link shown in Fig. 10 may be employed as described in the preceding paragraph, but in order to more surely prevent the hooks 21' and 22' from opening up under tension I preferably provide a fastening device such as shown at 41 in Fig. 11. This device may be placed in position around the shanks and the ends of the hooks 21' and 22' after which the long end 42 of the device may be bent down into the position shown in Fig. 10. Instead of manufacturing the link $A_5$ with the ends 23' lying in juxtaposed relationship to the shanks, the link may be manufactured in the form shown in Figs. 7 and 8, in which case the ends 23' may be hammered down against the shanks of the hooks 21' and 22' after the coöperating links have been inserted.

The link $A_6$ shown in Fig. 12 is similar to the link $A_2$ shown in Figs. 5 and 6, in that it has hooks 14' and 16' corresponding to hooks 14 and 16 in Figs. 5 and 6, one hook facing in one direction and the other hook facing in the opposite direction. However, in order to strengthen the hooks and prevent them from straightening out under tension at least one of the hooks is made double, as illustrated at 16'. The double hook 16' is preferably formed by continuing the hook 16 shown in Figs. 5 and 6, the continuation being folded outwardly through 180° at 43 and extended backwardly as shown at 44 along the other portion 46 of the double hook. The end of the continuation may be cut off at 47, but it is preferably extended around the shoulder 48 of the link as indicated at 49.

I claim:

1. A chain link comprising looped end portions angularly displaced from each other about the longitudinal axis of the link and having an opening in one side thereof intermediate the ends, and means disposed wholly on said side for attaching the two end portions together at said opening.

2. A chain link comprising a looped member having its end portions angularly displaced from each other about the longitudinal axis of the link and having an opening in one side thereof intermediate the ends, the other side of the link being spaced from said one side throughout its central region, and means for interlocking the ends of the member meeting at said opening.

3. A chain link comprising looped end portions fixedly disposed with respect to each other and angularly displaced from each other about the longitudinal axis of the link, and means for attaching the two end portions together intermediate the ends, the attaching means being adapted to permit the insertion of coöperating links into said end portions when the means is in detached condition and the space within the link being continuous from end to end.

4. A chain link comprising a looped member having an opening at one side for receiving coöperating links into the opposite end portions of the member, the opposite ends of the loop member being angularly displaced from each other about the longitudinal axis of the link, and means for hooking together the portions of the looped member disposed on opposite sides of said opening.

5. A chain link comprising a looped member having an opening at one side for receiving coöperating links into the opposite end portions of the member, the looped member being so shaped that the end portions are disposed substantially in longitudinal axial planes angularly displaced from each other 90°, and means individual to said one side of the link for hooking together the portions of the looped member disposed on opposite sides of said opening.

6. A chain link comprising a looped member having an opening at one side for receiving one or more coöperating links into the members, the looped member being so shaped that the end portions are disposed substantially in longitudinal axial planes angularly displaced from each other 90°, and means disposed on said one side of the link for closing the opening comprising members integrally connected with the looped member on the opposite sides of the opening.

7. A chain link comprising a member shaped in the form of an elongate loop and having an opening at one side, the portion of the member disposed on one side of the opening being folded back to form an eye adjacent the opening and to extend around and along one end of the looped member, and the portion of the member on the other side of the opening being adapted to be hooked into the eye.

8. A chain link comprising a member shaped in the form of an elongate loop and having an opening at one side, the portion of the member disposed on one side of the opening being folded back to form an eye adjacent the opening, the folded portion extending around and along one end of the looped member and being secured to the member on the side opposite the opening, and the portion of the member on the other side of the opening being adapted to be hooked into the eye.

9. A chain link comprising an elongate looped member, the member being twisted adjacent one end so that the end portions on opposite sides of the twisted portion are angularly displaced from each other about the longitudinal axis of the link, and a reinforcing member extending longitudinally of the looped member throughout the said one end and throughout the twisted portion.

10. A chain link comprising an elongate member formed into the shape of a loop, one end of the member being folded backwardly and extending around one end of the loop so as to make the loop double throughout the one end, and the other end of the member being adapted to be secured to said folded end, the member being twisted throughout a portion of the double end so that the extreme ends of the loop are disposed in planes angularly displaced from each other about the longitudinal axis of the link.

11. A chain link comprising an elongate member formed into the shape of a loop, one end of the member being folded backwardly to form an eye and extending around one end of the loop so as to make the loop double throughout the one end, and the other end of the member being adapted to pass through said eye so as to secure the two ends of the member together, the member being twisted throughout a portion of the double end so that the extreme ends of the loop are disposed in planes angularly disposed from each other about the longitudinal axis of the link.

12. A chain link comprising an elongate member formed into the shape of a loop, one end of the member being folded backwardly to form an eye and extending around one end of the loop so as to make the loop double throughout the one end, and the other end of the member being adapted to pass through said eye and be secured to said folded end, the member being twisted throughout a portion of the double end so that the extreme ends of the loop are disposed in planes angularly displaced from each other about the longitudinal axis of the link.

Signed by me at Boston, Massachusetts, this 13th day of March, 1917.

EDWARD S. KING.

Copies of this patent may be obtained for five cents each, by addressing the "Commissioner of Patents, Washington, D. C."